United States Patent
Lee et al.

(10) Patent No.: US 9,952,093 B2
(45) Date of Patent: Apr. 24, 2018

(54) ULTRAVIOLET INDEX MEASURING METHOD AND APPARATUS

(71) Applicant: KOREA RESEARCH INSTITUTE OF STANDARDS AND SCIENCE, Daejeon (KR)

(72) Inventors: Dong-Hoon Lee, Daejeon (KR); Seongchong Park, Daejeon (KR); Dong-Joo Shin, Daejeon (KR)

(73) Assignee: Korea Research Institute of Standards and Science, Daejeon (KR)

( * ) Notice: Subject to any disclaimer, the term of this patent is extended or adjusted under 35 U.S.C. 154(b) by 51 days.

(21) Appl. No.: 15/007,884

(22) Filed: Jan. 27, 2016

(65) Prior Publication Data

US 2016/0138970 A1 May 19, 2016

Related U.S. Application Data

(63) Continuation of application No. PCT/KR2014/007523, filed on Aug. 13, 2014.

(30) Foreign Application Priority Data

Aug. 19, 2013 (KR) .................. 10-2013-0097681

(51) Int. Cl.
*G01T 1/20* (2006.01)
*G01J 1/42* (2006.01)
*G01J 1/16* (2006.01)

(52) U.S. Cl.
CPC .............. *G01J 1/4228* (2013.01); *G01J 1/16* (2013.01); *G01J 1/429* (2013.01)

(58) Field of Classification Search
CPC ............. G01J 1/4228; G01J 1/16; G01J 1/429
(Continued)

(56) References Cited

U.S. PATENT DOCUMENTS 5,401,970 A * 3/1995 Kinsey ................... G01J 1/429
                                                    250/372
6,603,126 B2 * 8/2003 Yamada ................ G07D 7/121
                                                    250/372

(Continued)

FOREIGN PATENT DOCUMENTS

| JP | 2004 317318 A | 11/2004 |
|----|---------------|---------|
| JP | 2005 069843 A | 3/2005 |
| KR | 10 2005 0122775 A | 12/2005 |

OTHER PUBLICATIONS

English Translation of KR 10-2005-0122775.*

(Continued)

*Primary Examiner* — David Porta
*Assistant Examiner* — Abra Fein
(74) *Attorney, Agent, or Firm* — Jenkins, Wilson, Taylor & Hunt, P.A.

(57) ABSTRACT

An ultraviolet index measuring method and apparatus includes preparing a first photosensor having spectral response only in a first section of a wavelength between 250 nm and 298 nm, a second photosensor having spectral response only in a second section of a wavelength between 298 nm and 328 nm, and a third photosensor having spectral response only in a third section of a wavelength between 328 nm and 400 nm. An output signal of the first photosensor, an output signal of the second photosensor, and an output signal of the third photosensor are calibrated using spectral irradiance of reference solar light. First photocurrent of the first photosensor, second photocurrent of the second photosensor, and third photocurrent of the third photosensor are measured under a measurement environment. An ultraviolet index is calculated using the first photocurrent, the second photocurrent, and the third photocurrent under the measurement environment.

9 Claims, 6 Drawing Sheets

(58) Field of Classification Search
USPC .......................... 250/372, 252.1, 256, 370.11
See application file for complete search history.

(56) References Cited

U.S. PATENT DOCUMENTS

| | | | |
|---|---|---|---|
| 8,653,484 B2* | 2/2014 | Rudolph | ................ B01J 19/123 250/252.1 |
| 8,748,919 B2* | 6/2014 | Chua | ...................... H01L 33/06 250/504 R |

OTHER PUBLICATIONS

English Translation of JP 2004-317318.*
International Search Report for Application No. PCT/KR2014/007523 dated Oct. 30, 2014.
IPRP with Written Opinion for Application No. PCT/KR2014/007523 dated Feb. 23, 2016.

* cited by examiner

ULTRAVIOLET INDEX MEASURING METHOD AND APPARATUS

CROSS-REFERENCE TO RELATED APPLICATIONS

This application is a continuation of and claims priority to PCT/KR2014/007523 filed on Aug. 13, 2014, which claims priority to Korea Patent Application No. 10-2013-0097681 filed on Aug. 19, 2013, the entireties of which are both hereby incorporated by reference.

BACKGROUND

1. Technical Field

The present disclosure relates to ultraviolet index measuring apparatuses and, more particularly, to an ultraviolet (UV) index measuring apparatus and method of three channels having different spectral responses.

2. Description of Related Art

The ultraviolet (UV) index is an index that is expressed with a single number by integrating a solar spectral irradiance and a McKinlay-Diffey erythemal action spectrum curve, which indicates the degree of skin damage at respective wavelengths of about 285 nm to 385 nm, with a weighting function according to a wavelength. The UV index indicates an influence of solar UV on the skin.

UV index measuring sensors currently spreading on the market spectrally measure a UV index using high-cost equipment. Alternatively, a UV index measuring sensor is manufactured such that spectral response of the sensor is approximate to a McKinlay-Diffey erythemal action spectrum curve. The UV index measuring sensor employs a UV photodiode that is manufactured to have a McKinlay-Diffey erythemal action spectrum curve through multiple thin film coating. However, it is difficult to accurately set spectral response of a UV index measuring sensor to the McKinlay-Diffey erythemal action spectrum curve. Moreover, since special coating is required, the UV measuring sensor is high-priced.

SUMMARY

Embodiments of the present disclosure provide low-priced ultraviolet index measuring apparatuses.

An ultraviolet index measuring method according to an example embodiment of the present disclosure includes: preparing a first photosensor having spectral response only in a first section of a wavelength between 250 nm and 298 nm, a second photosensor having spectral response only a second section of a wavelength between 298 nm and 328 nm, and a third photosensor having spectral response only a third section of a wavelength between 328 nm and 400 nm; calibrating an output signal of the first photosensor, an output signal of the second photosensor, and an output signal of the third photosensor using spectral irradiance of reference solar light; measuring first photocurrent of the first photosensor, second photocurrent of the second photosensor, and third photocurrent of the third photosensor under a measurement environment; and calculating an ultraviolet index using the first photocurrent, the second photocurrent, and the third photocurrent under the measurement environment.

In an example embodiment, calibrating the output signal of the first photosensor, the output signal of the second photosensor, and the output signal of the third photosensor using the spectral irradiance of the reference solar light may include: measuring the spectral irradiance of the reference solar light; integrating a McKinlay-Diffey erythemal action spectrum curve and the spectral irradiance of the solar light in the first section to calculate a first contributory portion for calibration of the ultraviolet index; integrating the McKinlay-Diffey erythemal action spectrum curve and the spectral irradiance of the solar light in the second section to calculate a second contributory portion for calibration of the ultraviolet index; integrating the McKinlay-Diffey erythemal action spectrum curve and the spectral irradiance of the solar light in the third section to calculate a third contributory portion for calibration of the ultraviolet index; measuring first photocurrent for calibration of the first photosensor at the spectral irradiance of the reference solar light; measuring second photocurrent for calibration of the second photosensor at the spectral irradiance of the reference solar light; measuring third photocurrent for calibration of the third photosensor at the spectral irradiance of the reference solar light; calculating a first gain by dividing the first contributory portion for calibration by the first photocurrent for calibration; calculating a second gain by dividing the second contributory portion for calibration by the second photocurrent for calibration; and calculating a third gain by dividing the third contributory portion for calibration by the third photocurrent for calibration.

In an example embodiment, calculating the ultraviolet index using the first photocurrent, the second photocurrent, and the third photocurrent under the measurement environment may include: calculating a first calibration signal by multiplying the first photocurrent by the first gain; calculating a second calibration signal by multiplying the second photocurrent by the second gain; calculating a third calibration signal by multiplying the third photocurrent by the third gain; and obtaining an infrared index by summing the first calibration signal, the second calibration signal, and the third calibration signal.

In an example embodiment, the first to third photosensors may be different ultraviolet light emitting diode.

An ultraviolet index measuring apparatus according to an example embodiment of the present disclosure may include: a first photosensor having spectral response only in a first section of 250 nm to 298 nm; a second photosensor having spectral response only in a second section of 298 nm to 328 nm; a third photosensor having spectral response only in a third section of 328 nm to 400 nm; and a processor adapted to receive output signals of the first to third photosensor under solar light to calculate an ultraviolet index.

In an example embodiment, each of the first to the third photosensors may be an ultraviolet light emitting diode, a center wavelength of light emitting spectrum of the first photosensor may be 250 nm to 298 nm, a center wavelength of light emitting spectrum of the second photosensor may be 250 nm to 298 nm is 298 nm to 328 nm, and a center wavelength of light emitting spectrum of the third photosensor may be 328 nm to 400 nm.

In an example embodiment, the processor may include: an amplifier circuit adapted to amplify output signals of the first photosensor, the second photosensor, and the third photosensor and adjust gains of the first photosensor, the second photosensor, and the third photosensor; an AD converter adapted to convert an output signal of the amplifier circuit into a digital signal; and an operation part adapted to sum output signals of the AD converter to calculate an ultraviolet index.

In an example embodiment, the processor may include: an amplifier circuit adapted to amplify output signals of the first photosensor, the second photosensor, and the third photosensor; an AD converter adapted to convert an output signal of the amplifier circuit into a digital signal; a calibration part adapted to process an output signal of the AD converter to adjust the intensity of the processed output signal; and an operation part adapted to sum calibrated signals of the first photosensor to the third photosensor to calculate an ultraviolet index.

In an example embodiment, the ultraviolet index measuring apparatus may further include: a diffuser disposed in front of the first to third photosensors.

An ultraviolet index measuring apparatus according to an example embodiment of the present disclosure includes: a photosensor having spectral response in at least one of a first section of 250 nm to 298 nm, a second section of 298 nm to 328 nm, and a third section of 328 nm to 400 nm; and a processor adapted to receive an output signal of the photosensor under solar light to calculate an ultraviolet index. The photosensor may be an ultraviolet light emitting diode functioning as a light receiving device.

In an example embodiment, the photosensor may be an aluminum gallium nitride (AlGaN)-based ultraviolet light emitting diode.

A mobile communication terminal according to an example embodiment of the present disclosure includes an ultraviolet index measuring apparatus. The ultraviolet index measuring apparatus may include: a photosensor having spectral response in at least one of a first section of 250 nm to 298 nm, a second section of 298 nm to 328 nm, and a third section of 328 nm to 400 nm; and a processor adapted to receive an output signal of the photosensor under solar light to calculate an ultraviolet index. The photosensor may be an ultraviolet light emitting diode functioning as a light receiving device.

BRIEF DESCRIPTION OF THE DRAWINGS

The present disclosure will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the present disclosure.

DETAILED DESCRIPTION

Figure 1:
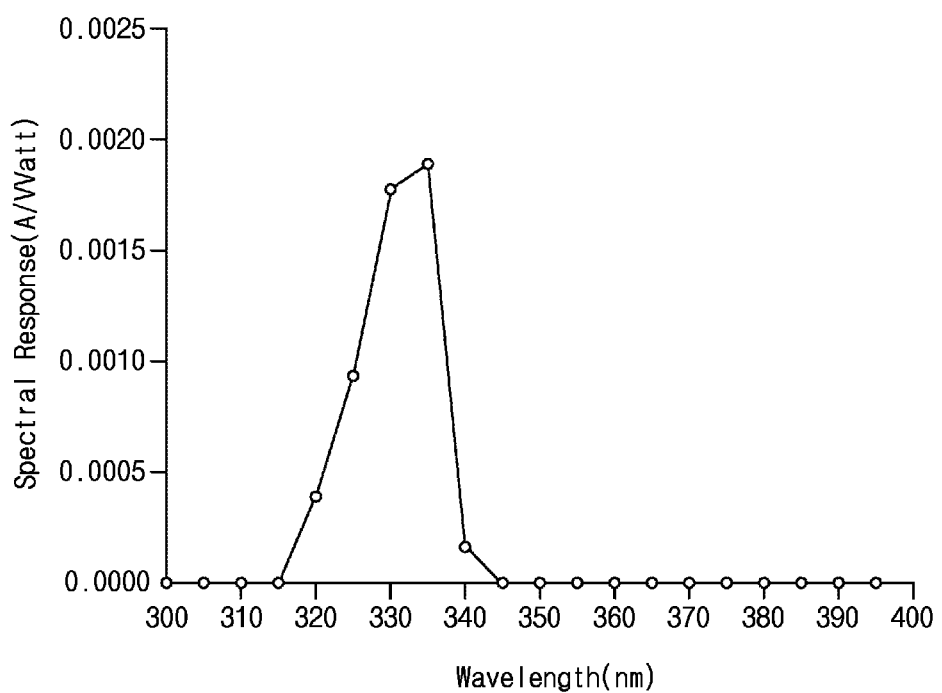
FIG. 1 shows a result of measuring spectral response of an ultraviolet LED according to an example embodiment of the present disclosure.

Preferred embodiments of the present disclosure will be described below in more detail with reference to the accompanying drawings. The present disclosure may, however, be embodied in different forms and should not be constructed. As limited to the embodiments set forth herein. Rather, these embodiments are provided so that this disclosure will be thorough and complete, and will fully convey the scope of the present disclosure to those skilled in the art. Like reference numerals refer to like elements throughout.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional views and/or plan views that are schematic illustrations of example embodiments. In the drawings, the thicknesses of layers and regions are exaggerated for clarity. As such, variations from the shapes of the illustrations as a result, for example, of manufacturing techniques and/or tolerances, are to be expected. Thus, example embodiments should not be construed as limited to the particular shapes of regions illustrated herein but may be to include deviations in shapes that result, for example, from manufacturing. For example, an implanted region illustrated as a rectangle may, typically, have rounded or curved features. Thus, the regions illustrated in the figures are schematic in nature and their shapes may be not intended to illustrate the actual shape of a region of a device and are not intended to limit the scope of example embodiments.

Hereinafter, it will be described about an exemplary embodiment of the present disclosure in conjunction with the accompanying drawings.

According to an example embodiment of the present disclosure, a UV photosensor employs a UV light emitting diode (UV LED). Thus, an economical and accurate UV index measuring apparatus may be provided.

A McKinlay-Diffey erythemal action spectrum curve is divided into three sections as follows:

(1) 250 nm<first section<298 nm,
(2) 298 nm<second section<328 nm,
(3) 328 nm<third section<400 nm.

In the first section, the curve has a fixed constant value. In the second section, the curve decreases with a sharp gradient. In the third section, the curve decreases with a gentle gradient.

A first photosensor may have spectral response only in the first section. A second photosensor may have spectral response only in the second section. A third photosensor may have a spectral response only in the third section.

In recent, an aluminum gallium nitride (AlGaN)-based LED may emits deep UV of about 200 nm to 360 nm with high efficiency.

Although an LED functions as a light emitting device, the LED may function as a light receiving device. However, efficiency of the LED functioning as a light receiving device is reduced. Accordingly, an LED is used as a light emitting device but is not used as a light receiving device. Nevertheless, since an ultraviolet index measuring apparatus according to an example embodiment of the present disclosure operates under the solar light, a UV LED is used as a light receiving device.

Specifically, the first photosensor may be a first UV LED having a peak in the first section. In the case that the first UV LED functions as a light emitting device, the peak may exist in the first section.

The second photosensor may be a second UV LED having a peak in the second section. In the case that the second UV LED functions as a light emitting device, the peak may exist in the second section.

The third photosensor may be a third UV LED having a peak in the third section. In the case that the third UV LED functions as a light emitting device, the peak may exist in the third section.

The first UV LED, the second UV LED, and the third UV LED are used as light receiving devices, respectively. Accordingly, photocurrents of the first UV LED, the second UV LED, and the third UV LED are measured.

FIG. 1 shows a result of measuring spectral response of an ultraviolet LED according to an example embodiment of the present disclosure.

Referring to FIG. 1, in the case that a UV LED used in a test functions as a light emitting device, a center wavelength is 340 nm. The UV LED may function as a light receiving device under the condition of solar light irradiation. Spectral response occurs in an area of 340 nm to 320 nm. Thus, UV LED may operate as a light receiving device in a second section.

Hereinafter, the operation principle of the present disclosure will now be described.

An ultraviolet (UV) index measuring method according to an example embodiment of the present disclosure may include preparing a photosensor, calibrating the photosensor, measuring photocurrent of the photosensor under a measurement environment, and calculating a UV index.

Preparing the photosensor may include preparing a first photosensor having spectral response only in a first section of a wavelength between 250 nm and 298 nm, a second photosensor having spectral response only a second section of a wavelength between 298 nm and 328 nm, and a third photosensor having spectral response only a third section of a wavelength between 328 nm and 400 nm.

Calibrating the photosensor may include calibrating an output signal of the first photosensor, an output signal of the second photosensor, and an output signal of the third photosensor using spectral irradiance of reference solar light.

Measuring the photocurrent of the photosensor under the measurement environment may include measuring first photocurrent of the first photosensor, second photocurrent of the second photosensor, and third photocurrent of the third photosensor under the measurement environment.

Calculating the UV index may include calculating the UV index using the first photocurrent, the second photocurrent, and the third photocurrent under the measurement environment.

According to an example embodiment of the present disclosure, a UV index measuring apparatus may calculate a UV index (UVI) by independently amplifying signals using three photosensors having different sensing wavelength areas and adding the amplified signals. The UV index measuring apparatus undergoes a calibration procedure. The calibration procedure is a procedure to decide gains $G_1$, $G_2$, and $G_3$ of the respective photosensors such that the sum of final signals of the respective photosensors is equal to the UVI.

The condition required for spectral response $S_1$ of the first photosensor, spectral response $S_2$, and spectral response $S_3$ of the third photosensor is as follows:

$S_1(\lambda) \neq 0$ for $\lambda < 298$ nm $S_1(\lambda) = 0$ for $\lambda > 298$ nm $S_2(\lambda) \neq 0$ for 298 nm $< \lambda <$ 328 nm $S_2(\lambda) = 0$ elsewhere $S_3(\lambda) \neq 0$ for 328 nm $< \lambda <$ 400 nm $S_3(\lambda) = 0$ elsewhere  Equation (1)

If the first to third photosensors are exposed to the reference solar light, primarily generated photocurrent signals $i_1$, $i_2$, and $i_3$ are expressed as follows:

$i_1 = A \int S_1(\lambda) E(\lambda) d\lambda;$ $i_2 = A \int S_2(\lambda) E(\lambda) d\lambda;$ $i_3 = A \int S_3(\lambda) E(\lambda) d\lambda;$  Equation (2)

In Equation (2), $E(\lambda)$ represents spectral irradiance (unit: $W/m^2$) of reference solar light and A represents a light receiving area of each photosensor. It is assumed that the light receiving areas are equal to each other.

The UV index (UVI) is the sum of contributory portions in the three sections, which are expressed as follows:

$$y_1 = \alpha \int_{250nm}^{298nm} E(\lambda) w(\lambda) d(\lambda), \text{ with } w(\lambda) = 1;$$

$$y_2 = \alpha \int_{298nm}^{328nm} E(\lambda) w(\lambda) d(\lambda), \text{ with } w(\lambda) = 10^{0.094(298-\lambda)};$$

$$y_3 = \alpha \int_{328nm}^{400nm} E(\lambda) w(\lambda) d(\lambda), \text{ with } w(\lambda) = 10^{0.015(139-\lambda)};$$

Equation (3)

In Equation (3), $w(\lambda)$ represents a McKinlay-Diffey erythemal action spectrum curve, $y_1$ represents a contributory portion of the UVI in the first section, $y_2$ represents a contributory portion of the UVI in the second section, and $y_3$ represents a contributory portion of the UVI in the third section. In addition, $\alpha$ represents a constant ($\alpha=1/(25$ mW/m2)) and $\lambda$ represents a wavelength.

A target of calibration is that $y_1+y_2+y_3=$UVI. Referring to Equation (1) to Equation (3), gains $G_1$, $G_2$, and $G_3$ of photocurrent signals $i_1$, $i_2$, and $i_3$ of the first to third photosensors that must be set through the calibration may be obtained as follows:

$$G_1 = \frac{y_1}{i_1}, G_2 = \frac{y_2}{i_2}, G_3 = \frac{y_3}{i_3}$$

Equation (4)

Information that must be known for the calibration is spectral irradiance ($E_{ref}(\lambda)$) and photocurrents ($i_{ref1}$, $i_{ref2}$, and $i_{ref3}$) of the first to third photosensors for the reference solar light. The calibration may provide the fact that maximums of the spectral responses of the respective photosensors match the McKinlay-Diffey erythemal action spectrum curve.

Figure 2:
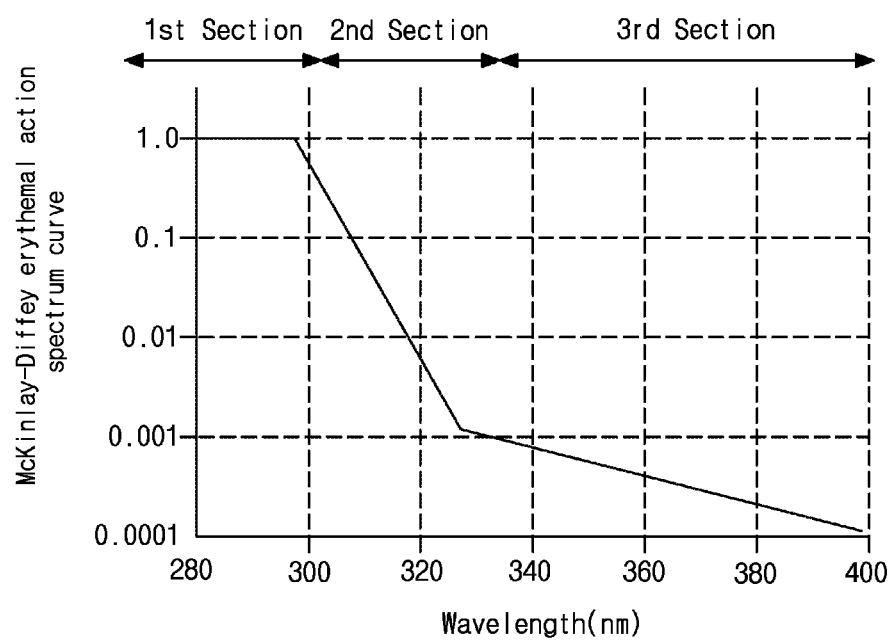
FIG. 2 shows a McKinlay-Diffey erythemal action spectrum curve.

FIG. 2 shows a McKinlay-Diffey erythemal action spectrum curve.

Figure 3:
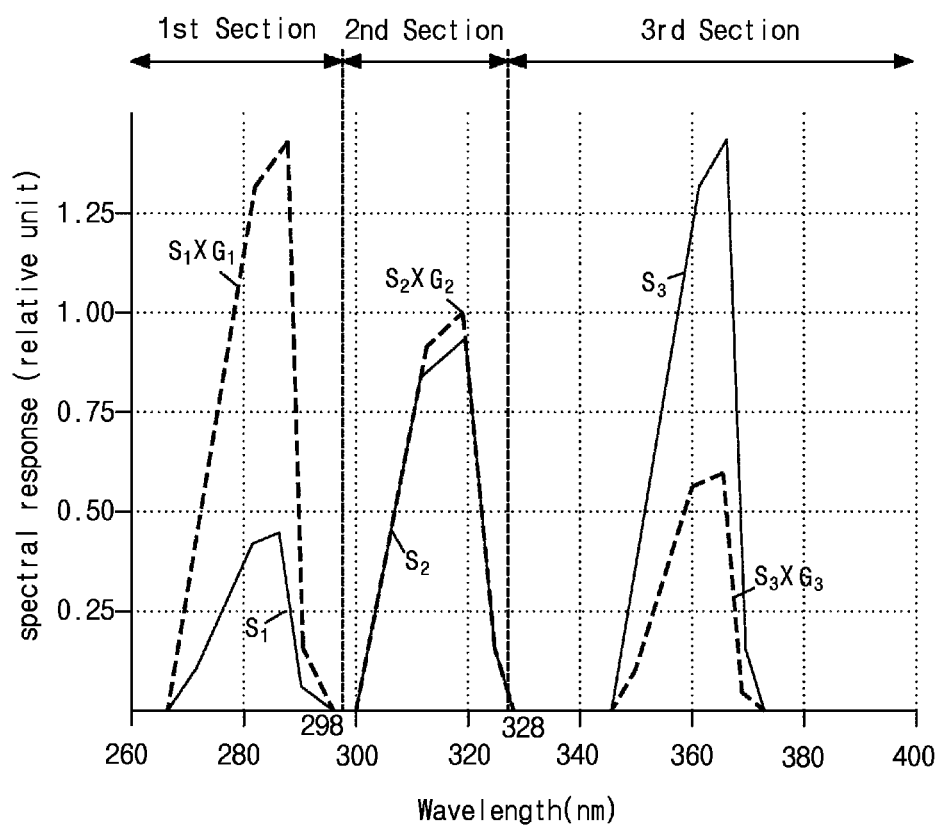
FIG. 3 shows spectral response and calibrated spectral response of photosensors.

FIG. 3 shows spectral response and calibrated spectral response of photosensors.

Referring to FIGS. 2 and 3, a center wavelength of the spectral response $S_1$ of the first photosensor exists in the first section. The intensity of spectral response ($S_1 \times G_1$) calibrated through the calibration may increase to follow characteristics of the McKinlay-Diffey erythemal action spectrum curve.

On the other hand, a center wavelength of the spectral response $S_3$ of the third photosensor exists in the third section. The intensity of spectral response ($S_2 \times G_3$) calibrated through the calibration may decrease to follow the characteristics of the McKinlay-Diffey erythemal action spectrum curve. Accordingly, the third gain $G_3$ may be tens of times smaller than the second gain $G_2$ and the second gain $G_2$ may be tens of times smaller than the first gain $G_1$, which may satisfy the condition that $G_1 > G_2 > G_3$.

The spectral irradiance of the reference solar light $E_{ref}(\lambda)$ is measured. A first contributory portion $y_{ref1}$ for calibration of the UV index is calculated by integrating the McKinlay-Diffey erythemal action spectrum curve and the spectral irradiance of the reference solar light $E_{ref}(\lambda)$ in the first section.

A second contributory portion $y_{ref2}$ for calibration of the UV index is calculated by integrating the McKinlay-Diffey erythemal action spectrum curve and the spectral irradiance of the reference solar light $E_{ref}(\lambda)$ in the second section.

A third contributory portion $y_{ref3}$ for calibration of the UV index is calculated by integrating the McKinlay-Diffey erythemal action spectrum curve and the spectral irradiance of the reference solar light $E_{ref}(\lambda)$ in the third section.

Then, first photocurrent $i_{ref1}$ for calibration of the first photosensor is measured at the spectral irradiance of the reference solar light $E_{ref}(\lambda)$. Second photocurrent $i_{ref1}$ for calibration of the second photosensor is measured at the spectral irradiance of the reference solar light $E_{ref}(\lambda)$. Third photocurrent $i_{ref1}$ for calibration of the third photosensor is measured at the spectral irradiance of the reference solar light $E_{ref}(\lambda)$.

The first gain G1 is calculated by dividing the first contributory portion $y_{ref1}$ for calibration by the first photocurrent $i_{ref1}$ for calibration. The second gain G2 is calculated by dividing the second contributory portion $y_{ref2}$ for calibration by the second photocurrent $i_{ref2}$ for calibration. The third gain G3 is calculated by dividing the third contributory portion $y_{ref3}$ for calibration by the third photocurrent $i_{ref3}$ for calibration.

To sum up, during the calibration, the spectral irradiance of the reference solar light $E_{ref}(\lambda)$ is measured with respect to the first to third sections by a reference spectroradiometer. Then, the contributory portions $y_{ref1}$, $y_{ref2}$, and $y_{ref3}$ are calculated according to Equation (3), respectively. In the spectral irradiance of the reference solar light $E_{ref}(\lambda)$, the ultraviolet index (UVI) is given as follows: $y_{ref1} + y_{ref2} + y_{ref3}$. In the spectral irradiance of the reference solar light $E_{ref}(\lambda)$, the first photocurrent $i_{ref1}$ for calibration of the first photosensor, the second photocurrent $i_{ref2}$ for calibration of the second photosensor, and the third photocurrent $i_{ref3}$ for calibration of the third photosensor are measured. Then, the gains $G_1$, $G_2$, and $G_3$ are calculated using Equation (4), respectively. After the calibration, the sum of calibrated output signals $i_{ref1} \times G_1 + i_{ref1} \times G_1 + i_{ref1} \times G_1$ of the first to third photosensors matches the ultraviolet index (UVI).

After the calibration, spectral irradiance having different intensity and profile than the spectral irradiance of the reference solar light may be irradiated to the photosensors. In this case, the first photocurrent $I_1$ of the first photosensor may be converted into a first calibration signal $(i_1 \times G_1)$ by the calibrated first gain $G_1$. The second photocurrent $I_2$ of the second photosensor may be converted into a second calibration signal $(i_2 \times G_2)$ by the calibrated second gain $G_2$. The third photocurrent $I_3$ of the third photosensor may be converted into a third calibration signal $(i_3 \times G_3)$ by the calibrated third gain $G_3$.

Under a random environment, spectral irradiance of solar light $E(\lambda)$ may have a different profile than the spectral irradiance $E_{ref}(\lambda)$ of the reference solar light. However, the spectral irradiance of solar light $E(\lambda)$ may increase or decrease in intensity as compared to the spectral irradiance of the reference solar light $E_{ref}(\lambda)$. The spectral irradiance of solar light $E(\lambda)$ may depend upon latitude of sun, measurement altitude or weather.

Calculating the ultraviolet index using the first photocurrent, the second photocurrent, and the third photocurrent under the measurement environment includes calculating a first calibration signal $Y_1$ by multiplying the first photocurrent $I_1$ by the first gain $G_1$ ($Y_1 = G_1 \times I_1$), calculating a second calibration signal $Y_2$ by multiplying the second photocurrent $I_2$ by the second gain $G_2$ ($Y_2 = G_2 \times I_2$), calculating a third calibration signal $Y_3$ by multiplying the third photocurrent $I_3$ by the third gain $G_3$ ($Y_3 = G_3 \times I_3$), and obtaining the infrared index by summing the first calibration signal, the second calibration signal, and the third calibration signal.

The photocurrents $I_1$, $I_2$, and $I_3$ of the first to third photosensors are measured at the random spectral irradiance of solar light to measure the ultraviolet index. Then, the first to third calibration signals ($Y_1 = G_1 \times I_1$, $Y_2 = G_2 \times I_2$, and $Y_3 = G_3 \times I_3$) are calculated using the previously calibrated amplification factors $G_1$, $G_2$, and $G_3$. The ultraviolet index is obtained by summing an amplification factor and multiplication of the photocurrents.

According to an example embodiment of the present disclosure, the spectral response $S_1$ of the first photosensor, the spectral response $S_2$ of the second photosensor, and the spectral response $S_3$ of the third photosensor may not be required for the calibration. Specifically, when the first photosensor is an ultraviolet LED, linewidth of the spectral response of the first photosensor may be decided if only a center wavelength of the ultraviolet LED is known. According to a test result, linewidth of the spectral response of the ultraviolet LED is about 20 nm.

The most important precondition for making the above calibration model effective is the condition of Equation (1) required for the spectral response of each photosensor. If only the condition of Equation (1) is satisfied, the maximum of the spectral response of each photosensor, a position of the maximum or bandwidth of the spectral response may have no influence on the calibration.

A gain of the photosensor may be adjusted through a gain of an amplifier circuit. Alternatively, the gain of the photosensor may be adjusted by converting an output signal of the photosensor into a digital signal and processing the converted digital signal.

Figure 4:
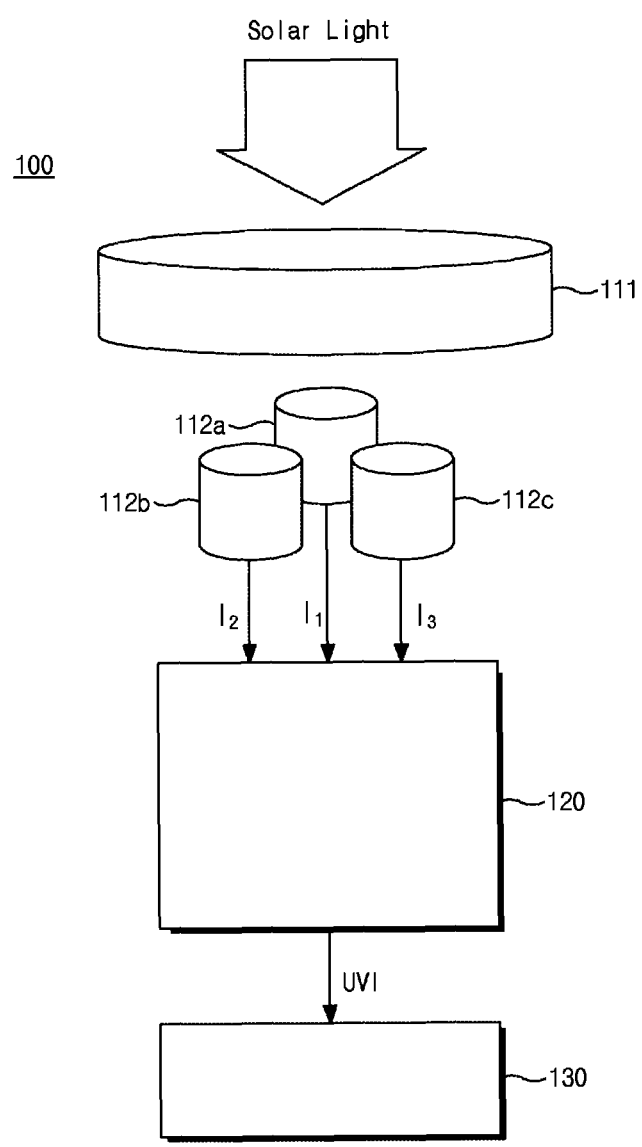
FIG. 4 is a conceptual diagram of an ultraviolet index measuring apparatus according to an example embodiment of the present disclosure.

FIG. 4 is a conceptual diagram of an ultraviolet index measuring apparatus according to an example embodiment of the present disclosure.

Figure 5:
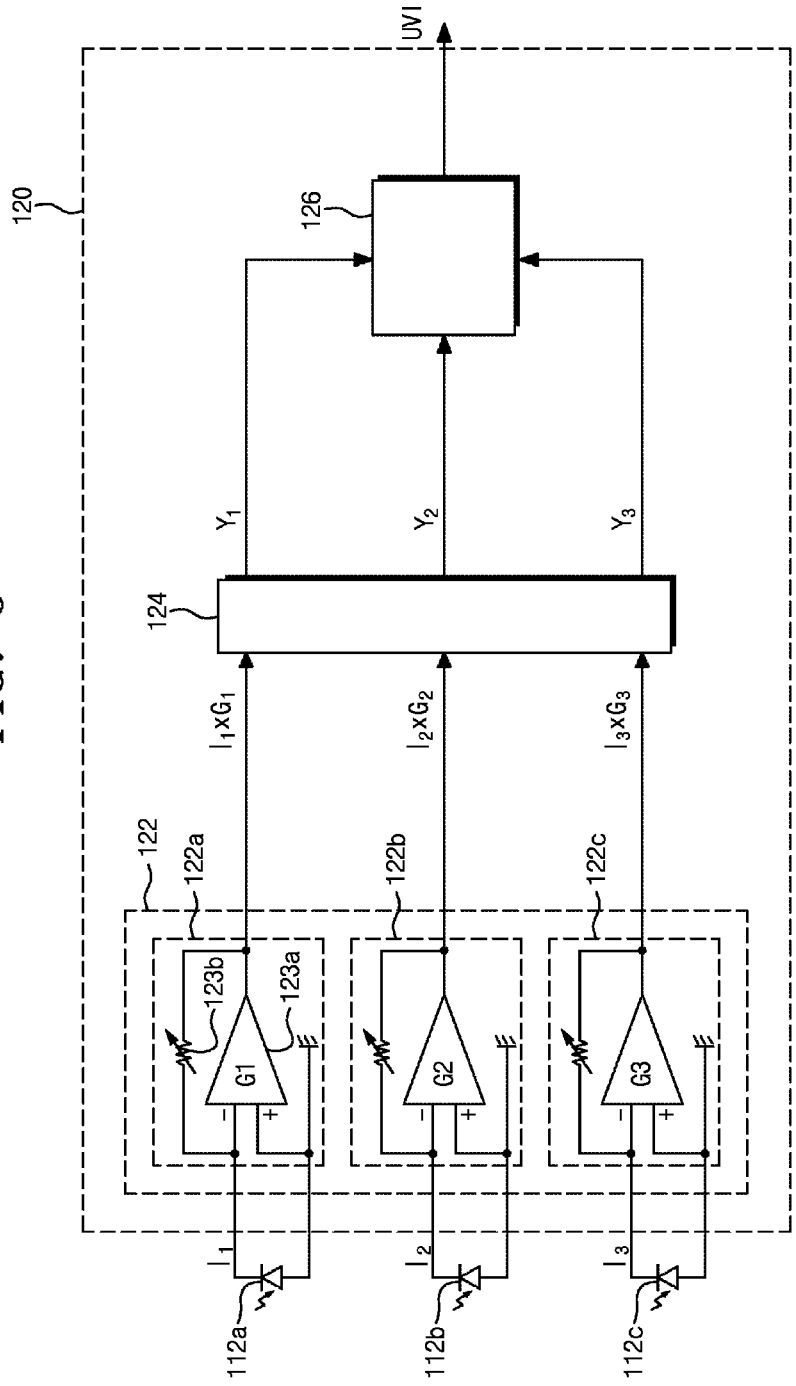
FIG. 5 illustrates a processing part in FIG. 4.

FIG. 5 illustrates a processing part in FIG. 4.

Referring to FIGS. 4 and 5, an ultraviolet index measuring apparatus 100 includes a first photosensor 112a having spectral response only in a first section of 250 nm to 298 nm, a second photosensor 112b having spectral response only in a second section of 298 nm to 328 nm, a third photosensor 112c having spectral response only in a third section of 328 nm to 400 nm, and a processor 120 adapted to receive output signals of the first photosensor 112a to the third photosensor 112c under solar light to calculate an ultraviolet index.

Each of the first photosensor 112a to the third photosensor 112c may be an ultraviolet light emitting diode. A center wavelength of light emitting spectrum of the first photosensor 112a may be 250 nm to 298 nm, a center wavelength of light emitting spectrum of the second photosensor 112b may be 250 nm to 298 nm is 298 nm to 328 nm, and a center wavelength of light emitting spectrum of the third photosensor 112c may be 328 nm to 400 nm.

An aluminum gallium nitride (AlGaN)-based LED may emit deep UV of about 200 nm to 360 nm with high efficiency. A wavelength of a UV LED may vary depending on a doping concentration.

Although a conventional LED functions as a light emitting device, the LED may function as a light receiving device. However, efficiency of the LED functioning as a light receiving device is reduced. Accordingly, an LED is used as a light emitting device but is not used as a light receiving device. Nevertheless, according to an example embodiment of the present disclosure, a UV LED is used as a photosensor.

Specifically, the first photosensor 112a may be a first UV LED having a peak in the first section. In the case that the first UV LED functions as a light emitting device, the peak may exist in the first section.

The second photosensor 112b may be a first UV LED having a peak in the second section. In the case that the second UV LED functions as a light emitting device, the peak may exist in the second section.

The third photosensor 112c may be a first UV LED having a peak in the third section. In the case that the third UV LED functions as a light emitting device, the peak may exist in the third section.

Photocurrents $I_1$, $I_2$, and $I_3$ of the first photosensor 112a, the second photosensor 112b, and the third photosensor 112c are measured. The calibration signal may be obtained by multiplying gains $G_1$, $G_2$, and $G_3$ by the Photocurrents $I_1$, $I_2$, and $I_3$. The calibration signals $Y_1$, $Y_2$, and $Y_3$ may be summed to provide an ultraviolet index.

A diffuser 111 may be disposed in front of the first photosensor 112a to the third photosensor 112c. The diffuser 111 may provide spectral irradiance $E(\lambda)$ of the same solar light to the first photosensor 112a to the third photosensor 112c.

The processor 120 may include an amplifier circuit 122 adapted to amplify output signals of the first photosensor 112a, the second photosensor 112b, and the third photosensor 112c and adjust gains of the first photosensor 112a, the second photosensor 112b, and the third photosensor 112c, an AD converter 124 adapted to convert an output signal of the amplifier circuit 112 into a digital signal, and an operation part 126 adapted to sum output signals of the AD converter 124 to calculate an ultraviolet index.

The amplifier circuit 122 may include a current-voltage converter circuit. The current-voltage converter circuit may include an operational amplifier 123a and a gain resistor 123b. A positive input terminal of the operational amplifier 123a may be grounded, and a negative input terminal thereof may be connected to a cathode of the first photosensor 112a and an output terminal of the operational amplifier 123a. An anode of the first photosensor 112a may be grounded.

The amplifier circuit 122 may include a first amplifier circuit 122a connected to the first photosensor 112a, a second amplifier circuit 122b connected to the second photosensor 112c, and a third amplifier circuit 122c connected to the third photosensor 112c. A first gain of the first amplifier circuit 122a may be adjusted during the calibration. A second gain of the second amplifier circuit 122b may be adjusted during the calibration. A third gain of the third amplifier circuit 122c may be adjusted during the calibration.

The AD converter 124 may output the first calibration signal $Y_1$ obtained by converting an output of the first amplifier circuit 122a into a digital signal, a second calibration signal $Y_2$ obtained by converting an output of the second amplifier circuit 122b into a digital signal, and a third calibration signal $Y_3$ obtained by converting an output of the third amplifier circuit 122c into a digital signal.

The operation part may sum the first to third calibration signals $Y_1$, $Y_2$, and $Y_3$ to output an ultraviolet index.

A display unit 130 may receive and display the ultraviolet index of the operation part 226.

Figure 6:
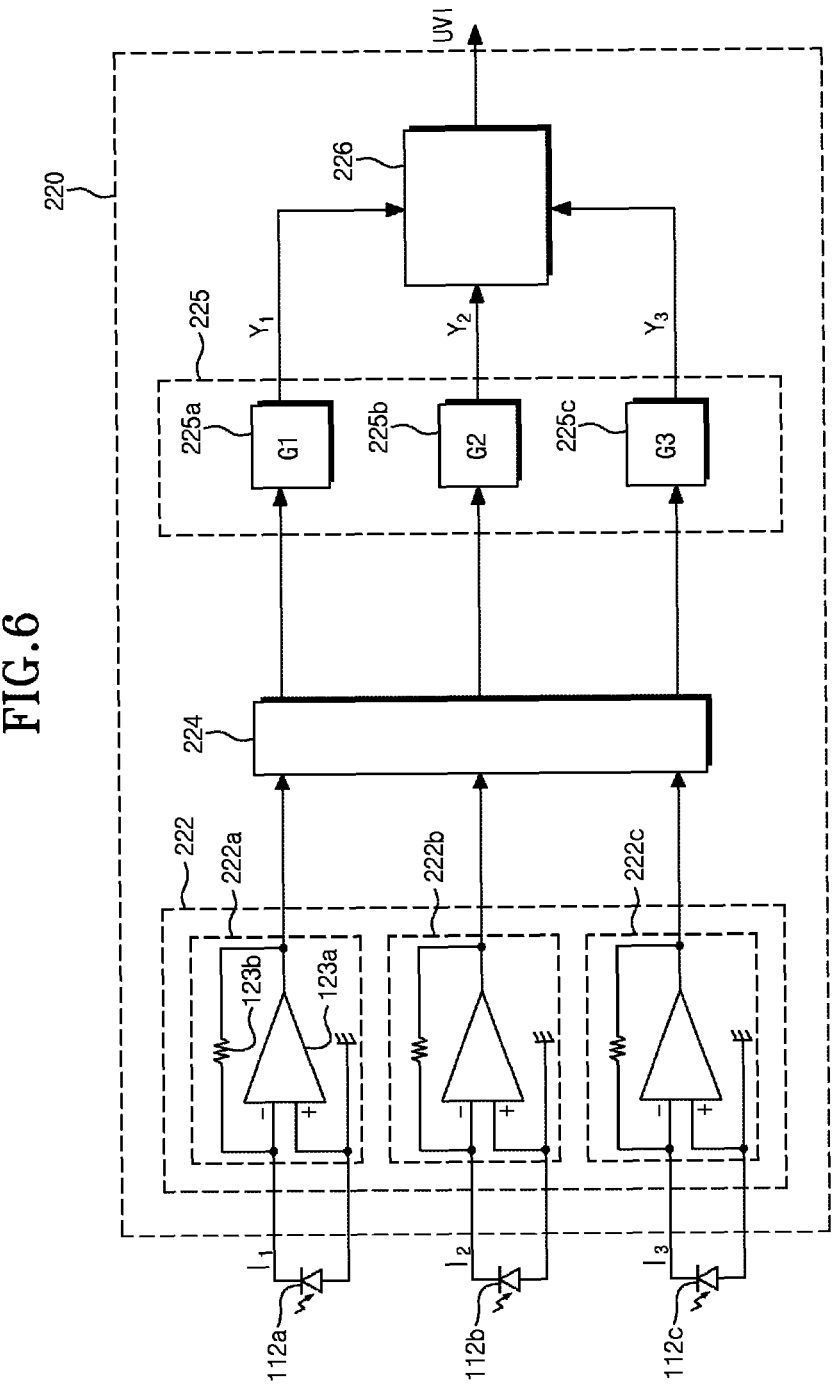
FIG. 6 shows an ultraviolet index measuring apparatus according to a modified embodiment of the present disclosure.

FIG. 6 shows an ultraviolet index measuring apparatus according to a modified embodiment of the present disclosure.

Referring to FIG. 6, a processor 220 includes an amplifier circuit 222 adapted to amplify output signals of the first photosensor 112a, the second photosensor 112b, and the third photosensor 112c, an AD converter 224 adapted to convert an output signal of the amplifier circuit 222 into a digital signal, a calibration part 225 adapted to process an output signal of the AD converter 224 to adjust the intensity of the processed output signal, and an operation part 226 adapted to sum calibrated signals of the first photosensor 112a to the third photosensor 112c to calculate an ultraviolet index.

The amplifier circuit 222 may include a first amplifier circuit 222a connected to the first photosensor 112a, a second amplifier circuit 222b connected to the second photosensor 112b, and a third amplifier circuit 222c connected to the third photosensor 112c. The amplifier circuit 222 may include a current-voltage converter circuit. The current-voltage converter circuit may include an operational amplifier and a gain resistor. A positive input terminal of the operational amplifier may be grounded, and a negative input terminal thereof may be connected to a cathode of the first photosensor 112a and an output terminal of the operational amplifier. An anode of the first photosensor 112a may be grounded. A gain of the amplifier circuit 222 may be fixed.

The AD converter 224 may output a first photocurrent signal obtained by converting an output of the first amplifier circuit 222a into a digital signal, a second photocurrent signal obtained by converting an output of the second amplifier circuit 222b into a digital signal, and a third photocurrent signal obtained by converting an output of the third amplifier circuit 222c into a digital signal.

The calibration part 225 may process an output signal of the AD converter 224 to adjust the intensity of the processed output signal. The calibration part 225 may include a first calibration part 225a, a second calibration part 225b, and a third calibration part 225c. The first calibration part 225a may output a first calibration signal $Y_1$ by multiplying the first photocurrent signals by a first gain. The second calibration part 225b may output a second calibration signal $Y_2$ by multiplying the second photocurrent signals by a second gain. The third calibration part 225c may output a third calibration signal $Y_3$ by multiplying the third photocurrent signals by a third gain.

The operation part 226 may sum the first calibration signal $Y_1$, the second calibration signal $Y_2$, and the third calibration signal $Y_3$ to output an ultraviolet index (UVI).

A display part 130 may receive and display the ultraviolet index of the operation part 226.

In recent, a mobile communication terminal is equipped with various sensors to perform various functions. Specifically, a mobile communication terminal includes a geomagnetic sensor, an acceleration sensor, a GPS sensor or a temperature sensor. According to an example embodiment of the present disclosure, the ultraviolet index measuring apparatus may be mounted on the mobile communication terminal. Specifically, the ultraviolet index measuring apparatus may be mounted together with or separately from a camera module of the mobile communication module.

According to an example embodiment of the present disclosure, an ultraviolet index may be simply measured using a currently manufactured and sold UV LED as a photosensor.

Although the present disclosure has been described in connection with the embodiment of the present disclosure illustrated in the accompanying drawings, it is not limited thereto. It will be apparent to those skilled in the art that various substitutions, modifications and changes may be made without departing from the scope and spirit of the present disclosure.

What is claimed is:

1. An ultraviolet index measuring method comprising:
   preparing a first photosensor having spectral response only in a first section of a wavelength between 250 nm and 298 nm, a second photosensor having spectral response only in a second section of a wavelength between 298 nm and 328 nm, and a third photosensor having spectral response only in a third section of a wavelength between 328 nm and 400 nm;
   calibrating an output signal of the first photosensor, an output signal of the second photosensor, and an output signal of the third photosensor using spectral irradiance of reference solar light;
   measuring a first photocurrent of the first photosensor, a second photocurrent of the second photosensor, and a third photocurrent of the third photosensor under a measurement environment; and
   calculating an ultraviolet index using the first photocurrent, the second photocurrent, and the third photocurrent under the measurement environment,
   wherein calibrating the output signal of the first photosensor, the output signal of the second photosensor, and the output signal of the third photosensor using the spectral irradiance of the reference solar light comprises:
   measuring the spectral irradiance of the reference solar light;
   integrating a McKinlay-Diffey erythemal action spectrum curve and the spectral irradiance of a solar light in the first section to calculate a first contributory portion for calibration of the ultraviolet index;
   integrating the McKinlay-Diffey erythemal action spectrum curve and the spectral irradiance of a solar light in the second section to calculate a second contributory portion for calibration of the ultraviolet index;
   integrating the McKinlay-Diffey erythemal action spectrum curve and the spectral irradiance of a solar light in the third section to calculate a third contributory portion for calibration of the ultraviolet index;
   measuring the first photocurrent for calibration of the first photosensor at the spectral irradiance of the reference solar light;
   measuring the second photocurrent for calibration of the second photosensor at the spectral irradiance of the reference solar light;
   measuring the third photocurrent for calibration of the third photosensor at the spectral irradiance of the reference solar light;
   calculating a first gain by dividing the first contributory portion for calibration by the first photocurrent for calibration;
   calculating a second gain by dividing the second contributory portion for calibration by the second photocurrent for calibration; and
   calculating a third gain by dividing the third contributory portion for calibration by the third photocurrent for calibration.

2. The ultraviolet index measuring method of claim 1, wherein calculating the ultraviolet index using the first photocurrent, the second photocurrent, and the third photocurrent under the measurement environment comprises:
   calculating a first calibration signal by multiplying the first photocurrent by the first gain;
   calculating a second calibration signal by multiplying the second photocurrent by the second gain;
   calculating a third calibration signal by multiplying the third photocurrent by the third gain; and
   obtaining an infrared index by summing the first calibration signal, the second calibration signal, and the third calibration signal.

3. The ultraviolet index measuring method of claim 1, wherein the first to third photosensors are different ultraviolet light emitting diodes.

4. An ultraviolet index measuring apparatus comprising:
   a first photosensor having spectral response only in a first section of 250 nm to 298 nm;
   a second photosensor having spectral response only in a second section of 298 nm to 328 nm;
   a third photosensor having spectral response only in a third section of 328 nm to 400 nm; and
   a processor adapted to receive output signals of the first to third photosensor under solar light to calculate an ultraviolet index,
   wherein the processor calibrates an output signal of the first photosensor, an output signal of the second photosensor, and an output signal of the third photosensor by using a spectral irradiance of a reference solar light,
   wherein the processor stores a first contributory portion for calibration of the ultraviolet index by integrating a McKinlay-Diffey erythemal action spectrum curve and a spectral irradiance of a solar light in the first section,
   wherein the processor stores a second contributory portion for calibration of the ultraviolet index by integrating the McKinlay-Diffey erythemal action spectrum curve and a spectral irradiance of a solar light in the second section,
   wherein the processor stores a third contributory portion for calibration of the ultraviolet index by integrating the McKinlay-Diffey erythemal action spectrum curve and a spectral irradiance of a solar light in the third section,
   wherein the processor stores a first gain calculated by dividing the first contributory portion for calibration by a first photocurrent for calibration,
   wherein the processor stores a second gain calculated by dividing the second contributory portion for calibration by a second photocurrent for calibration, and
   wherein the processor stores a third gain calculated by dividing the third contributory portion for calibration by a third photocurrent for calibration.

5. The ultraviolet index measuring apparatus of claim 4, wherein each of the first to the third photosensors is an ultraviolet light emitting diode,
   a center wavelength of light emitting spectrum of the first photosensor is 250 nm to 298 nm,
   a center wavelength of light emitting spectrum of the second photosensor is 298 nm to 328 nm, and
   a center wavelength of light emitting spectrum of the third photosensor is 328 nm to 400 nm.

6. The ultraviolet index measuring apparatus of claim 4, wherein the processor comprises:

an amplifier circuit adapted to amplify output signals of the first photosensor, the second photosensor, and the third photosensor and adjust gains of the first photosensor, the second photosensor, and the third photosensor;

an AD converter adapted to convert an output signal of the amplifier circuit into a digital signal; and an operation part adapted to sum output signals of the AD converter to calculate an ultraviolet index.

7. The ultraviolet index measuring apparatus of claim 4, wherein the processor comprises:

an amplifier circuit adapted to amplify output signals of the first photosensor, the second photosensor, and the third photosensor;

an AD converter adapted to convert an output signal of the amplifier circuit into a digital signal;

a calibration part adapted to process an output signal of the AD converter to adjust the intensity of the processed output signal; and an operation part adapted to sum calibrated signals of the first photosensor to the third photosensor to calculate an ultraviolet index.

8. The ultraviolet index measuring apparatus of claim 4, further comprising a diffuser disposed in front of the first to third photosensors.

9. A mobile communication terminal including an ultraviolet index measuring apparatus, wherein the ultraviolet index measuring apparatus comprises:

a photosensor having spectral response in at least one of a first section of 250 nm to 298 nm, a second section of 298 nm to 328 nm, and a third section of 328 nm to 400 nm; and a processor adapted to receive an output signal of the photosensor under solar light to calculate an ultraviolet index, wherein the photosensor is an ultraviolet light emitting diode functioning as a light receiving device, wherein the processor calibrates an output signal of the first photosensor, an output signal of the second photosensor, and an output signal of the third photosensor by using a spectral irradiance of a reference solar light, wherein the processor stores a first contributory portion for calibration of the ultraviolet index by integrating a McKinlay-Diffey erythemal action spectrum curve and a spectral irradiance of a solar light in the first section, wherein the processor stores a second contributory portion for calibration of the ultraviolet index by integrating the McKinlay-Diffey erythemal action spectrum curve and a spectral irradiance of a solar light in the second section, wherein the processor stores a third contributory portion for calibration of the ultraviolet index by integrating the McKinlay-Diffey erythemal action spectrum curve and a spectral irradiance of a solar light in the third section, wherein the processor stores a first gain calculated by dividing the first contributory portion for calibration by a first photocurrent for calibration, wherein the processor stores a second gain calculated by dividing the second contributory portion for calibration by a second photocurrent for calibration, and wherein the processor stores a third gain calculated by dividing the third contributory portion for calibration by a third photocurrent for calibration.

\* \* \* \* \*